United States Patent
Uehara et al.

(10) Patent No.: US 6,802,560 B2
(45) Date of Patent: Oct. 12, 2004

(54) SUNROOF APPARATUS FOR VEHICLE

(75) Inventors: Tatsuaki Uehara, Tochigi-ken (JP); Kouichi Hotta, Tochigi-ken (JP); Masaharu Ohnishi, Wako (JP); Michio Tamura, Wako (JP); Tatsuya Ohara, Wako (JP)

(73) Assignees: Yachiyo Kogyo Kabushiki Kaisha, Sayama (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/402,975

(22) Filed: Apr. 1, 2003

(65) Prior Publication Data

US 2003/0184127 A1 Oct. 2, 2003

(30) Foreign Application Priority Data

Apr. 2, 2002 (JP) .................................. 2002-100003
Apr. 2, 2002 (JP) .................................. 2002-100004

(51) Int. Cl.$^7$ ................................................ B60J 7/00
(52) U.S. Cl. ...................................................... 296/214
(58) Field of Search ................................. 296/214, 213, 296/224

(56) References Cited

U.S. PATENT DOCUMENTS 6,062,636 A * 5/2000 Thyssen ..................... 296/213
6,231,118 B1 * 5/2001 Yera ........................... 296/214
6,299,245 B1 * 10/2001 Thiele et al. ................ 296/214
6,386,626 B1 * 5/2002 Makino et al. .............. 296/214

* cited by examiner

Primary Examiner—Dennis H. Pedder
(74) Attorney, Agent, or Firm—Armstrong, Kratz, Quintos, Hanson & Brooks, LLP

(57) ABSTRACT

A sunroof apparatus with a sliding panel freely opening and closing an opening of a roof in a vehicle, a movable drain arranged below a rear end in the panel and moving forward and rearward interlocking with a forward and rearward movement of the panel, and a sunshade covering a lower side of the sliding panel and freely opening and closing. A holding means for the sunshade is constructed by forming sliding grooves in frames in both sides extending along a longitudinal direction in a side of a passenger room of the opening, forming a notch at a predetermined position of the groove L3 fitting front and rear sliders to which the sunshade is mounted, and integrally forming an engagement piece made of elastic member and fitted to the notch in the rear slider. Further, a position regulating means, at the time of manually closing the sunshade in a state in which the panel is half open or fully open and at the time of manually opening the sunshade in a closed state of the panel, is constructed by integrally forming a stopper protruding to an upper side of the groove L2 in a slider fitted to the groove L3, to which the movable drain is mounted.

10 Claims, 6 Drawing Sheets

SUNROOF APPARATUS FOR VEHICLE

BACKGROUND OF THE INVENTION

1. Field of the Invention

The present invention relates to a sunroof apparatus provided on a roof of a vehicle, and more particularly to a position regulation of a sunshade provided in the sunroof apparatus.

2. Description of the Related Art

There has been conventionally known a sunroof apparatus which freely opens and closes an opening formed in the roof of the vehicle by a sliding panel and covers a lower side of the sliding panel by a sunshade provided in the opening in a side of a passenger room so as to freely open and close.

Mounting frames are provided in both sides in the side of the passenger room of the opening of the roof in the vehicle, and the sliding panel (the roof panel) is mounted to front and rear panel sliders slidably fitted to a panel sliding groove formed in the mounting frame, respectively, for example, by a pin connection or a cam connection.

The sliding panel is driven by a push-pull cable mounted to a rear panel slider (a panel driving slider), and the sliding panel is located at a tilt position at which a rear end of the sliding panel is ascended with respect to a front end of the sliding panel, a closed position at which the whole of the sliding panel is positioned in the opening of the roof, and an open position at which the sliding panel moves to a rear side of the opening via a slide waiting position at which the rear end of the sliding panel descends to a lower side of the roof, and the opening is open, by pushing and pulling the push-pull cable.

A movable drain extending to a width direction of the vehicle is arranged in the lower side of the rear end of the sliding panel, and the movable drain is mounted to a drain slider which is slidably fitted to the panel sliding groove. The drain slider is connected to the sliding panel by a rod or the like, and the movable drain moves forward and rearward interlocking with the forward and rearward movement of the sliding panel.

The sunshade is placed in the opening in the side of the passenger room so as to freely slide in a longitudinal direction of the vehicle by mounting the sunshade to front and rear sunshade sliders which are slidably fitted to a sunshade sliding groove in an inner side of the panel sliding groove of the mounting frame. Thus, the sunshade is structured such as to cover the lower side of the sliding panel in the opening in the side of the passenger room so as to freely open and close. The sunshade can be manually opened and closed, and the movable drain is brought into contact with the rear sunshade slider and pushes the rear sunshade slider on the basis of the rear movement of the movable drain interlocking with the sliding panel, whereby the sunshade can be opened interlocking with the sliding panel.

The sunshade slider is conventionally provided with a projection as an engagement piece which protrudes in a perpendicular direction to a sliding direction by a compression spring, and a notch to which the projection is fitted is provided at a predetermined position of the sunshade sliding groove. Accordingly, in a state in which the sliding panel is fully closed, at the time of fully closing the sunshade by a manual operation, and at the time of fully opening the sunshade interlocking with the sliding panel, the sunshade at the fully closed position and the fully open position is held without moving from the position by fitting the projection of the sunshade slider to the notch of the sunshade sliding groove.

However, in this conventional holding means, since the projection operates perpendicularly to the sliding direction of the sunshade slider, an entanglement occurs in the projection at the time of operation, and there is a risk that the projection does not operate well.

Further, mechanical stoppers are conventionally provided in a front end portion and a rear end portion of the sunshade sliding groove, thereby regulating the position of the sunshade. That is, the structure is made such that when manually closing the sunshade in a state in which the sliding panel is fully closed, the front sunshade slider is brought into contact with the mechanical stopper in the front end portion, whereby the sunshade does not move forward any more. Further, the structure is made such that when further opening the half open or fully open sunshade in a state in which the sliding panel is half open or fully open, the rear sunshade slider is brought into contact with the mechanical stopper in the rear end portion of the sunshade sliding groove, the sunshade does not move rearward any more.

However, when manually opening the sunshade in a state in which the sliding panel is fully closed, the front sunshade slider is brought into contact with the front end of the movable drain, thereby regulating the more rearward movement of the sunshade. Further, when manually closing the sunshade in a state in which the sliding panel is half or fully open, the more forward movement of the sunshade is regulated by bringing the rear sunshade slider into contact with the rear end of the movable drain.

Accordingly, in the prior art, if the sunshade is manually opened and closed roughly, the sunshade slider collides with the movable drain, whereby a great impact is applied. In order to cope with this matter, it is necessary to make the movable drain thick so as to increase its strength, and it is necessary to firmly mount the movable drain to the drain slider by using a fastening means, such as a bolt, a rivet or the like.

Therefore, an object of the present invention is to provide a sunroof apparatus in which a sunshade opened and closed to a predetermined position can be lightly held in such a manner as not to move from the position by suitably operating an engagement piece without generating any entanglement.

Another object of the present invention is to provide a sunroof apparatus in which a great impact can be prevented from being applied to a movable drain even when a sunshade is manually opened and closed roughly.

SUMMARY OF THE INVENTION

In order to solve the problems mentioned above, in accordance with one aspect of the present invention, there is provided a sunroof apparatus for a vehicle comprising:

a sliding panel in which an opening is formed in a roof of the vehicle, mounting frames are placed in both sides along a longitudinal direction of the vehicle in a side of a passenger room facing to the opening, front and rear panel sliders are fitted to a panel sliding groove formed in the mounting frame, and the sliding panel is slidably placed in the longitudinal direction of the vehicle by mounting the sliding panel to the front and rear panel sliders so as to open and close the opening of the roof in accordance with the sliding motion; and a sunshade in which front and rear sunshade sliders are fitted to a sunshade sliding groove formed in the mounting frame, and the sunshade is placed in a lower side of the sliding panel so as to freely slide in the longitudinal direction of the vehicle by mounting the sunshade to the front and rear sunshade sliders, whereby the sunshade is manually movable in the longitudinal direction and covers the lower side of the sliding panel, wherein a notch is formed at a predetermined position of the sunshade sliding groove, and an engagement piece made of an elastic member and being capable of fitting to the notch is integrally provided in the front and/or rear sunshade slider, and wherein the sunshade moving to a position at which the engagement piece and the notch are fitted is lightly held in accordance with the fitting between the engagement piece and the notch in such a manner as not to move from the moved position.

In the present invention, because the structure is made such that the engagement piece made of the elastic member is integrally provided in the front and/or rear sunshade slider and the engagement piece is fitted to the notch formed in the sunshade sliding groove by the rotation around the base end, the engagement piece is not entangled at the time of operating, so that an operability is good and an operation sound can be reduced. Further, since the engagement piece and the notch fitted thereto are combined, a structure of the holding means for the sunshade is simple, so that it is possible to achieve a compact size and a weight saving and to reduce an assembling man-hour.

In accordance with another aspect of the present invention, there is provided a sunroof apparatus for a vehicle comprising:

a sliding panel in which an opening is formed in a roof of the vehicle, mounting frames are placed in both sides along a longitudinal direction of the vehicle in a side of a passenger room facing to the opening, front and rear panel sliders are fitted to a panel sliding groove formed in the mounting frame, and the sliding panel is slidably placed in the longitudinal direction of the vehicle by mounting the sliding panel to the front and rear panel sliders so as to open and close the opening of the roof in accordance with the sliding motion;

a movable drain extending in a width direction of the vehicle, in which a drain slider is fitted to the panel sliding groove, and the movable drain is placed in a lower side of a rear end of the sliding panel so as to freely slide in the longitudinal direction of the vehicle by mounting the movable drain to the drain slider; and a sunshade in which front and rear sunshade sliders are fitted to a sunshade sliding groove formed in the mounting frame, and the sunshade is placed in a lower side of the sliding panel and an upper side of the movable drain so as to freely slide in the longitudinal direction of the vehicle by mounting the sunshade to the front and rear sunshade sliders, whereby the sunshade is manually movable in the longitudinal direction and covers the lower side of the sliding panel, wherein a stopper protruding above the sunshade sliding groove is integrally provided in the movable drain slider, and a rear end of the stopper is brought into contact with a front end of the rear sunshade slider, thereby allowing the sunshade to move to a rear side interlocking with a rearward movement of the movable drain, wherein at the time of manually opening the sunshade with respect to the sliding panel in a state in which the sliding panel is fully closed, the sunshade is inhibited from moving rearward further by bringing the rear end of the front sunshade slider into contact with the front end of the stopper, and wherein at the time of manually closing the sunshade with respect to the sliding panel which is in an open state including a half open state, the sunshade is inhibited from moving forward further by bringing the front end of the rear sunshade slider into contact with the rear end of the stopper.

In the present invention, because the sunshade slider is brought into contact with the stopper integrally provided with the drain slider at the time of manually opening and closing the sunshade, thereby inhibiting the sunshade from moving further, when the sunshade is manually opened and closed roughly, it is possible to prevent the impact from being directly applied to the movable drain from the sunshade slider, and it is possible to prevent the great impact from being applied to the movable drain. Accordingly, it is not necessary to make the movable drain thick, it is possible to intend to achieve a thin structure and a weight saving, it is not necessary to firmly mount the movable drain to the drain slider by a bolt fastening, a rivet fastening or the like, and it is possible to simplify the mounting of the movable drain.

In accordance with the present invention, it is possible to mount an impact damping member, such as a rubber or the like, to a surface of the stopper. Thus, it is possible to further increase an impact reducing effect and to more effectively reduce the impact.

DETAILED DESCRIPTION OF THE PREFERRED EMBODIMENT

Figure 1:
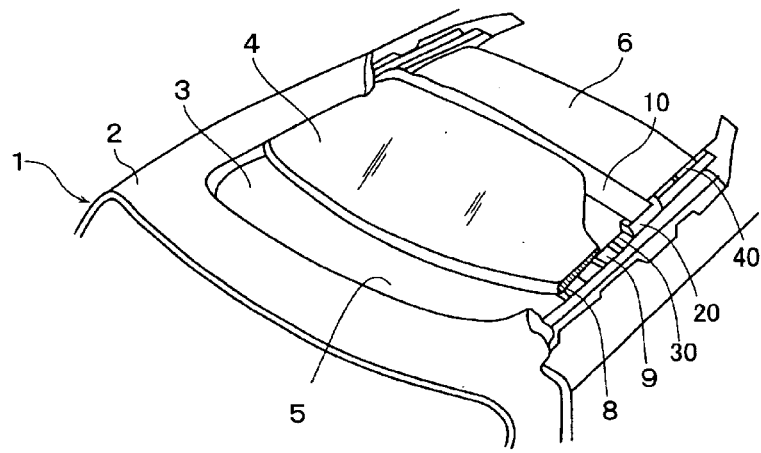
FIG. 1 is a perspective view showing a sunroof apparatus in accordance with the present invention, which is placed in a roof of a vehicle.

FIG. 1 is a perspective view showing a sunroof apparatus in accordance with the present invention which is placed in a roof of a vehicle. The sunroof apparatus is structured such that an opening 3 formed in a roof 2 of a vehicle 1 is freely opened and closed by a sliding panel (a roof panel) 4 made of a glass, and a sunshade 6 provided in an opening 5 in a side of a passenger room corresponding to the opening 3 covers a lower side of the sliding panel 4 so as to freely open and close the sliding panel.

Figure 2:
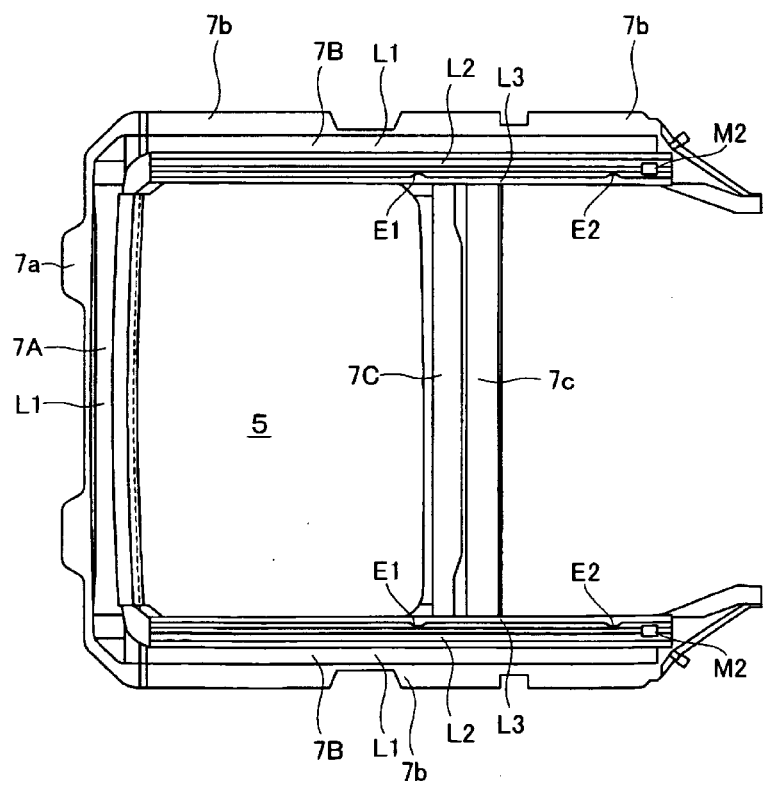
FIG. 2 is a plan view showing mounting frames of the sunroof apparatus in FIG. 1.

Mounting frames 7A, 7B and 7B extending along a front portion and both side portions and a reinforcing frame 7C connecting between middle portions of the frames 7B, 7B of the both side portions are provided in a side of the passenger room of the opening 3 in the roof 2, as shown in FIG. 2. An opening 5 in a side of the passenger room is defined by these frames 7A to 7C in correspondence to the opening 3. The frames 7A to 7C are mounted to a lower side of the roof 2 in the periphery of the opening 3 by peripheral mounting portions 7a to 7c with keeping a gap with respect to the roof via mounting jigs.

A fixed drain L1 receiving rain coming down on the sliding panel 4 and discharging the rain is formed in each of the frames 7A, 7B and 7B, and a panel sliding groove L2 and a sunshade sliding groove L3 are further formed in an inner side of the fixed drain L1 in the frames 7B in the both side portions which are extending along a longitudinal direction of the vehicle.

Figure 3:
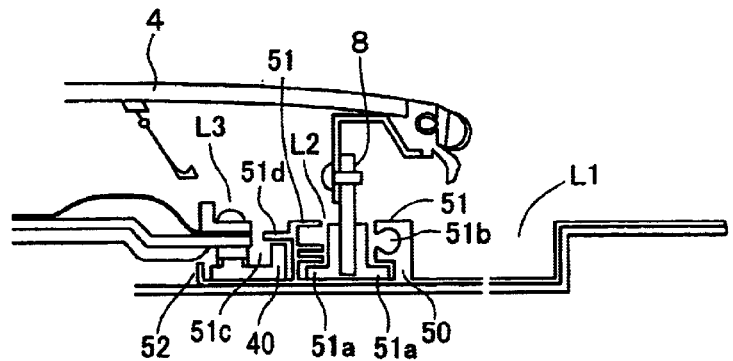
FIG. 3 is a cross sectional view showing the mounting frames in both side portions in FIG. 2 and sliders fitted to sliding grooves thereof.

The sliding grooves L2 and L3 are comprised of a guide rail 50 integrally formed with the fixed drain L1, as shown in FIG. 3. The sliding groove L2 is constructed as a gap between standing vertical frames 51, 51 of the rail 50, recess portions 51a, 51a are formed in lower portions in mutually opposing sides of the vertical frames 51, 51, and a circular arc shaped recess portion 51b is formed over the recess portion 51a in the outer vertical frame 51. The sliding groove L3 is constructed as a gap between a little protruding frame 52 of the rail 50 and one frame 51 mentioned above, and a recess portion 51c is formed in the frame 51 by a horizontal protruding portion 51d.

Figure 4:
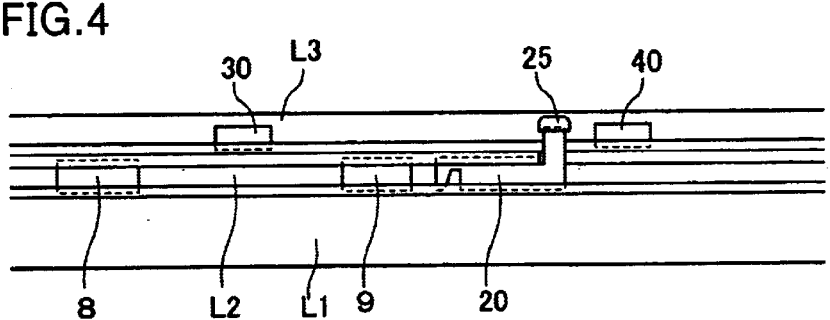
FIG. 4 is a schematic view showing an arrangement of the sliders to the sliding grooves of the mounting frames in both side portions.

A front panel slider 8 is slidably mounted to the sliding groove L2 by fitting sliding portions having elastic portions in both side lower ends extending along a longitudinal direction of the front panel slider 8 to the recess portions 51a, 51a of the panel sliding groove L2. A rear panel slider (a panel driving slider) 9 and a drain slider 20 are further slidably mounted to the panel sliding groove L2, as shown in FIG. 4. Front and rear sunshade sliders 30 and 40 are slidably mounted to the sunshade sliding groove L3.

Figure 5:
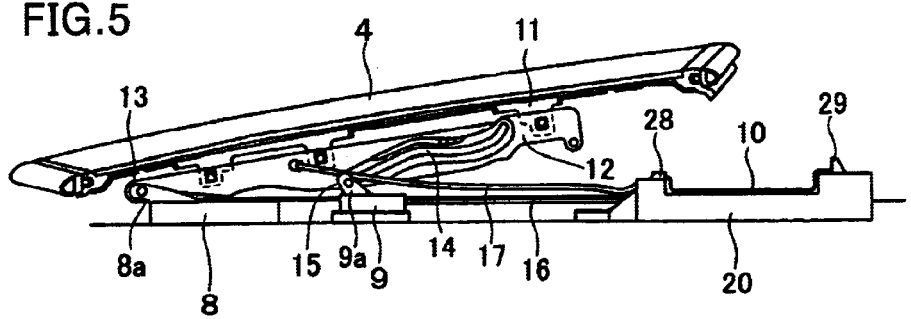
FIG. 5 is a side view showing an operation of a sliding panel of the sunroof apparatus.

The sliding panel 4 is mounted to the panel sliders 8 and 9, as shown in FIG. 5. That is, both side portions of the sliding panel 4 are supported by supporting portions 11, and the sliding panel 4 is mounted to the front and rear panel sliders 8 and 9 via a mounting frame 12 fixed to the supporting portion 11. In the present embodiment, an arm 8a provided in the front panel slider 8 is pivoted to a front portion of the mounting frame 12 by a pin 13, and a pin 15 provided in an arm 9a of the driving slider 9 is engaged with a cam groove 14 formed from an approximately center portion of the mounting frame 12 toward a rear side and moving upward and downward in a longitudinal direction. A push-pull cable 16 inserted into the recess portion 51b of the sliding groove L2 is mounted to the driving slider 9, and this push-pull cable 16 is connected to a drive source (not shown) which reciprocates the cable 16 on the basis of a gear drive obtained by a motor. A movable drain 10 is arranged below a rear end of the sliding panel 4. The drain slider 20 of the movable drain 10 and the mounting frame 12 are connected to each other by a rod 17 pivoted thereon.

The sliding panel 4 is at a closed position at which the whole of the sliding panel is positioned at the opening 3 of the roof 2, that is, a fully closed state, in a state in which the pin 15 of the driving slider 9 is at a predetermined position in an approximately center of the cam groove 14. When pushing the driving slider 9 by the push-pull cable 16 from the state in which the sliding panel 4 is at the closed position, the pin 15 of the driving slider 9 moves up to the front end along the cam groove 14, and the sliding panel 4 takes a tilt position (a ventilation position) in which the rear and of the sliding panel 4 ascends with respect to the pin connected front end, as shown in FIG. 5. When pulling the driving slider 9 by the push-pull cable 16 in the state in which the sliding panel 4 is at the closed position, the pin 15 moves to the rear end of the cam groove 14, and the rear end of the sliding panel 4 takes a slide waiting position in which the rear end of the sliding panel 4 descends to the lower side of the roof 2 within the opening 3. When further pulling the driving slider 9 by the push-pull cable 16, the sliding panel 4 moves to the rear of the opening 3, and takes an open position in which the opening 3 is open. The sliding panel 4 existing at the open position is accommodated in an accommodating position between the roof 2 at the rear of the opening 3 and the frames 7B, 7B.

On the contrary, when pushing the driving slider 9 forward from the state in which the sliding panel 4 is open, by the push-pull cable 16, the sliding panel 4 moves to the front side of the opening 3 from the accommodating position, and the sliding panel 4 returns to the slide waiting position mentioned above in which the rear end of the sliding panel is positioned below the opening 3. When further pushing the driving slider 9 by the push-pull cable 16, the rear end of the sliding panel 4 ascends, and the opening 3 is closed by the sliding panel 4. When further pushing, the sliding panel 4 is at the tilt position in which the rear end of the sliding panel 4 ascends.

Figure 6:
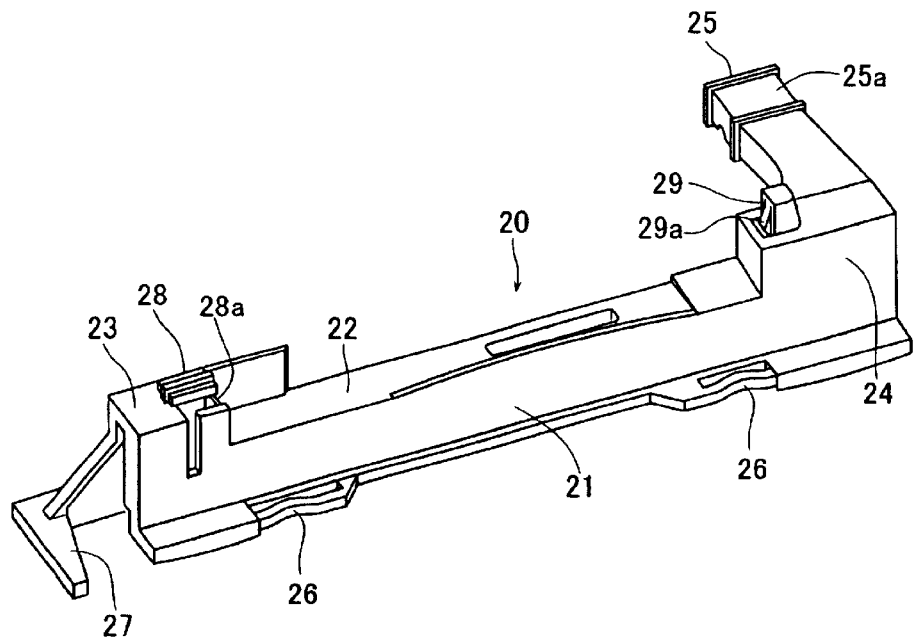
FIG. 6 is a perspective view showing a drain slider of the sunroof apparatus.
Figure 7:
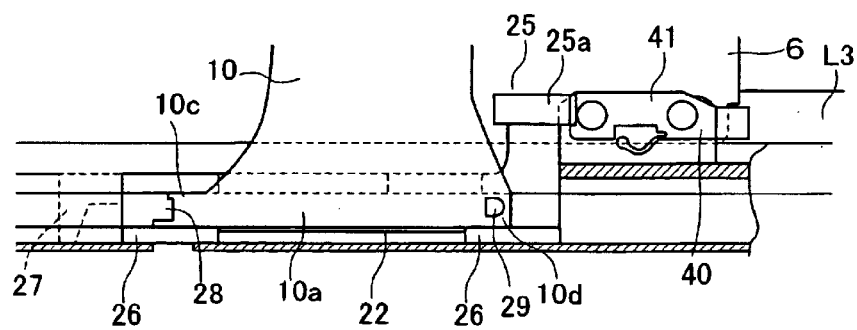
FIG. 7 is a plan view showing an arrangement of the drain slider in FIG. 6 to a panel sliding groove and a mounting of the movable drain to the slider.

The drain slider 20 is provided with an approximately rectangular parallelepiped main body 21, made of resin material, having a recess-shaped supporting portion 22 in a top surface center portion, for supporting a side portion of the movable drain 10, as shown in FIG. 6, and projections 28 and 29 for attaching front side and rear side of a side portion of the movable drain 10 are integrally formed on top surfaces of front and rear portions 23 and 24 with respect to the supporting portion 22. Further, an upper portion of the rear portion 24 in the drain slider 20 protrudes inwardly in a horizontal direction above the sunshade sliding groove L3 in an inner side so as to form the stopper 25, as shown in FIG. 7, and an impact absorbing member 25a made of rubber is covered on a surface of the stopper 25. A plurality of elastic portions 26 curved in an upward direction are provided in each of the lower ends of both side portions extending along a longitudinal direction of the drain slider main body 21, and the drain slider 20 is slidably mounted to the panel sliding groove L2 by fitting the elastic portions 26, 26 in both sides to the recess portions 51a, 51a of the panel sliding groove L2 so as to hold. An approximately triangular guide portion 27 extending to the recess portions 51a, 51a in both sides of the sliding groove L2 is provided in the front portion of the drain slider main body 21.

The movable drain 10 is comprised of a channel extended in a width direction of the vehicle and having a shallow recess portion in the form of a U-shaped in a cross section as shown in FIG. 5, and mounting portions 10a are provided in both side portions thereof. A horizontal collar portion 10c provided in a front side of the mounting portion 10a is press fitted into a horizontal notch groove 28a in a lower side of a projection 28 in a front side of the drain slider 20, a hole portion 10d provided in a rear side of the mounting portion 10*a* is inserted into a rear projection 29 of the slider 20, and a protruding plate 29*a* protruding a lower end to a side of an inner surface of the projection 29 carries out a come-off prevention. In the manner mentioned above, the movable drain 10 is attached to the drain slider 20 in accordance with a simple method without using a bolt fastening, a rivet fastening or the like.

When pulling the driving slider 9 by the push-pull cable 16 so as to move (open) the sliding panel 4 rearward, the drain slider 20 is pushed rearward by the rod 17 mounted between the sliding panel 4 and the drain slider 20, and the movable drain 10 is moved rearward. On the contrary, when pushing the driving slider 9 so as to move (close) the sliding panel 4 forward, the movable drain slider 20 is pulled forward by the rod 17, and the movable drain 10 moves forward. In the manner mentioned above, the movable drain 10 is at the position below the rear end of the sliding panel 4 and moves forward and rearward interlocking with the forward and rearward movement of the sliding panel 4.

The front and rear sunshade sliders 30 and 40 are slidably fitted to the sunshade slider groove L3, and the sunshade 6 is mounted to the sliders 30 and 40. Thus, the sunshade 6 is provided so as to cover the lower side of the sliding panel 4 in a freely opening and closing manner in the opening in the side of the passenger room. Further, mechanical stoppers made of rubber are inserted into the recess portions 51*c* in the front end portion and the rear end portion of the sunshade sliding groove L3.

Figure 8:
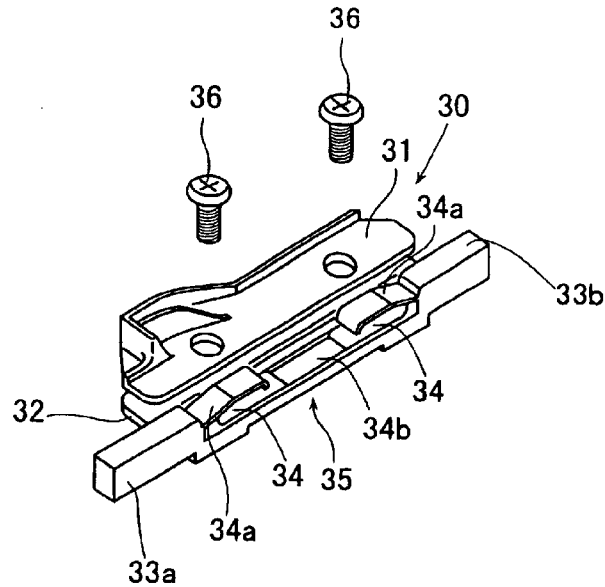
FIG. 8 is a perspective view showing a front sunshade slider of the sunroof apparatus.
Figure 9:
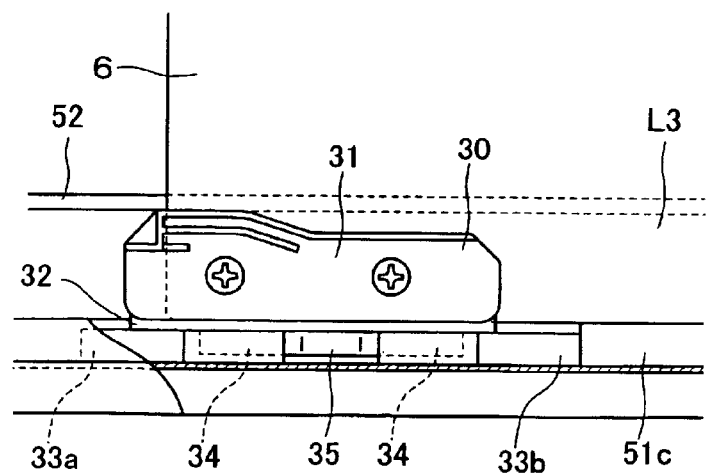
FIG. 9 is a plan view showing an arrangement of the front sunshade slider in FIG. 8 to the sunshade sliding groove and a mounting of the sunshade to the front slider.

The front sunshade slider 30 is comprised of an upper member 31 and a lower member 32 which are made of resin material, as shown in FIGS. 8 and 9. Approximately half of the lower member 32 forms a sliding portion 35 so as to be exposed to a side portion from the upper member 31 and protrude in a longitudinal direction, and both front and rear end portions of the sliding portion 35 form guide portions 33*a*, 3*a*. Elastic portions 34, 34 are provided between the guide portions 33*a*, 33*b*, and these elastic portions 34, 34 are structured such as to press insert both end portions of one sheet spring 34*b* into curved pieces 34*a*, 34*a* which are integrally formed with the lower member 32 and curved so as to protrude in an upward direction. The front sunshade slider 30 is slidably mounted to the sliding groove L3 by fitting the sliding portion 35 to the recess portion 51*c* of the sunshade sliding groove L3 so as to be held by the elastic portions 34, 34.

The front portion of the side portion in the sunshade 6 is mounted to the front sunshade slider 30. That is, the front portion of the side portion in the sunshade 6 is inserted between the upper and lower members 31 and 32 of the front slider 30, and screws 36, 36 inserted into mounting holes provided in the sunshade 6 from the upper member 31 are engaged with the lower member 32.

Figure 10:
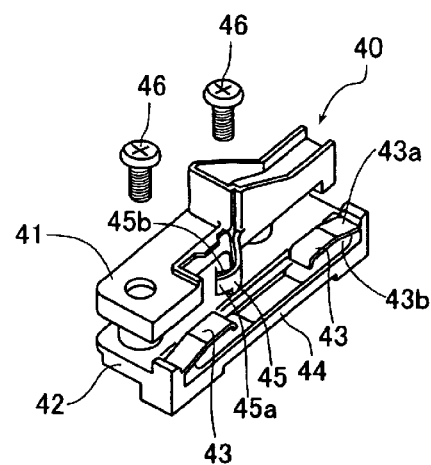
FIG. 10 is a perspective view showing a rear sunshade slider of the sunroof apparatus.
Figure 11:
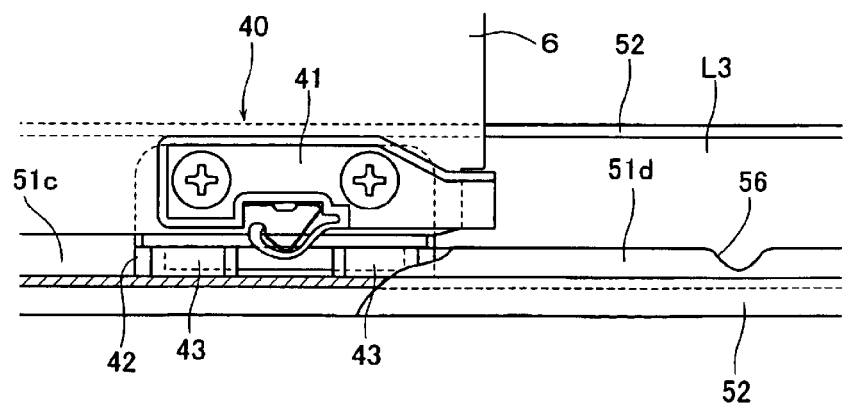
FIG. 11 is a plan view showing an arrangement of the rear sunshade slider in FIG. 9 to the sunshade sliding groove and a mounting of the sunshade to the rear slider.

The rear sunshade slider 40 is comprised of an upper member 41 and a lower member 42 which are made of resin material, as shown in FIGS. 10 and 11. In the same manner as mentioned above, an approximately half of the lower member 42 exposed to a side portion from the upper member 41 forms a sliding portion 44 having elastic portions 43, 43, and the elastic portions 43, 43 are structured such as to press insert both end portions of one sheet spring 43*b* into curved pieces 43*a*, 43*a* which are integrally formed with the lower member 42 and curved so as to protrude in an upward direction. The rear sunshade slider 40 is slidably mounted to the sliding groove L3 by fitting the sliding portion 44 to the recess portion 51*c* of the sunshade sliding groove L3 so as to be held by the elastic portions 43, 43.

The rear portion of the side portion in the sunshade 6 is mounted to the rear sunshade slider 40. That is, the rear portion of the side portion in the sunshade 40 is inserted between the upper and lower members 41 and 42 of the rear slider 40, and screws 46, 46 are inserted into mounting holes of the sunshade 6 from the upper member 41 so as to be engaged with the lower member 42.

In accordance with the present invention, an engagement piece 45 comprising one of the holding means for the sunshade 6 is provided in the upper member 41 of the rear sunshade slider 40. A notch 56 comprised of a shallow valley-shaped recess portion having a gentle incline is formed as another constituent element of the holding means for the sunshade 6, in the horizontal protruding portion 51*d* of the frame 51 comprising the sunshade sliding groove L3. The engagement piece 45 is comprised of an elastic member, and in the present embodiment, is constructed by press inserting a leaf spring 45*b* into a curved piece 45*a* integrally formed with the upper member 41 and protruding horizontally in a cantilever manner above the lower member 42 from an approximately center portion of the upper member 41. The engagement piece 45 faces to an upper side between the elastic portions 43, 43 of the lower member 42, and is structured such that the engagement piece 45 is in pressure contact with the end surface of the protruding portion 51*d* above the recess portion 51*c* in a state of mounting the rear sunshade slider 40 to the sliding groove L3.

When the engagement piece 45 of the rear sunshade slider 40 reaches the notch 56 by moving the sunshade 6, the engagement piece 45 rotates around a base end by an elastic force of the leaf spring 45*b* so as to protrude, thereby being inserted into the notch 56. Thus, the sunshade 6 is lightly held so that the sunshade 6 does not move from the moved position.

The notch 56 may be provided at a desired position. In the present embodiment, as shown in FIG. 2, the notch 56 is formed at positions E1 and E2 in the sunshade sliding groove L3. The position E1 is a place in which the engagement piece 45 of the rear sunshade slider 40 is positioned at the time when the sliding panel 4 is in the closed (the fully closed) state and the sunshade 6 is in a closed (a fully closed) state. The front side guide portion 33*a* of the front sunshade slider 30 is brought into contact with the front mechanical stopper of the leading end portion of the sunshade sliding groove L3, and the engagement piece 45 is fitted to the notch 56 at the position E1, whereby the fully closed sunshade 6 is held by a light pressure so as not to move from the fully closed position.

The position E2 is a place in which the engagement piece 45 of the rear sunshade slider 40 is positioned at the time when the sunshade 6 is fully open interlocking with the full opening motion of the sliding panel 4. The engagement piece 45 is fitted to the notch 56 at the position E2, whereby the sunshade 6 is held by a light pressure so as not to move from the interlocking fully open position. The sunshade 6 can be further manually opened a little from the fully open position interlocking with the sliding panel until the rear sunshade slider 40 is brought into contact with the rear mechanical stopper M2 of the rear end portion in the sunshade sliding groove L3. Of course, the sunshade 6 can be opened to an optional position manually from the fully closed position up to the fully open position (the manually fully open position) at which the rear sunshade slider is brought into contact with the rear mechanical stopper M2.

As described above, because the engagement piece 45 comprised of the elastic member is integrally provided in the rear sunshade slider 40 and is fitted to the notch 56 of the sunshade sliding groove L3 by the rotation around the base end of the engagement piece 45, the engagement piece 45 is not entangled at the time of operating, so that an operability of the engagement piece 45 is good and an operating sound can be reduced. Further, because the engagement piece 45 and the notch 56 fitted to the engagement piece are combined, the structure of the holding means for the sunshade is simple, so that it is possible to achieve a compact size and a weight saving and to reduce an assembling man-hour.

In the structure mentioned above, the engagement piece 45 is comprised of the elastic member comprising two parts, however, it may be comprised of as a one-part elastic member formed by resin or metal. Further, a shape thereof may be formed simply in a cantilever linear protruding piece or the like.

The engagement piece 45 is provided in the rear sunshade slider 40, however, the present invention is not limited to this. The engagement piece may be provided in the front sunshade slider 30, or may be provided in both of the front and rear sunshade sliders 30 and 40. Further, the holding position of the sunshade 6 is set to the fully closed position of the sunshade and the fully open position of the sunshade interlocking with the sliding panel 4, however, it may be set to an optionally desired position.

Figure 12:
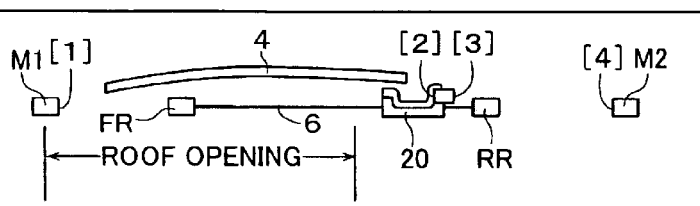
FIG. 12 is a table showing an opening and closing operation of the sunshade.

A description will be given of the opening and closing operation of the sunshade 6 with reference to FIG. 12. In FIG. 12, reference numeral (1) denotes a rear end position of the mechanical stopper M1 for regulating the front end position of the front sunshade slider 30, reference numeral (2) denotes a front end position of the stopper 25 of the drain slider 20, reference numeral (3) denotes a rear end position of the stopper 25, and reference numeral (4) denotes a front end position of the mechanical stopper M2 for regulating the rear end position of the rear sunshade slider 40. Reference symbols FR and RR denote the front sunshade slider 30 and the rear sunshade slider 40, respectively.

As shown in FIG. 12, when the sunshade is at the closed position in a state in which the sliding panel 4 is at the closed position (the same at the tilt position), the front end of the FR (the guide portion 33a of the front sunshade slider 30)) is brought into contact with the rear end position (1) of the front mechanical stopper M1. When manually moving the sunshade 6 rearward with respect to the sliding panel 4 from this state so as to fully open the sunshade 6, the rear end of the RR (the rear end of the upper member 41 in the rear sunshade slider 40)) is brought into contact with the front end position (2) of the drain slider stopper 25 (ii). When fully closing the sunshade 6 with respect to the sliding panel 4 manually in a state in which the sliding panel 4 is at the closed position, the front end of the FR is brought into contact with the rear end (1) of the mechanical stopper M1 (i).

Next, when fully opening the sliding panel 4, the rear end position (3) of the drain slider stopper 25 is brought into contact with the front end position of the RR (the front end position of the upper member 41 in the rear sunshade slider 40)), and the sunshade 6 is fully open interlocking with the sliding panel 4 (the full open at the interlocking open time) (iii). The sunshade 6 can be manually opened a little further with respect to the fully open sliding panel 4 until the RR is brought into contact with a front end position (4) of the mechanical stopper M2 (iv). Further, when closing the sunshade 6 manually from the open position, the RR is brought into contact with the rear end position (3) of the stopper 25, and the sunshade 6 is closed up to the fully open position at the interlocking open time (v).

The same matter as at the fully open time is applied to the time of half opening the sliding panel. When half opening the sliding panel 4, the rear end position (3) of the drain slider stopper 25 is brought into contact with the front end position of the RR, and the sunshade 6 is half opened interlocking with the sliding panel 4 (vi). When further opening the half open sunshade 6 manually, the sunshade 6 is open until the RR is brought into contact with the front end position (4) of the mechanical stopper M2 (vii). Further, when closing the sunshade 6 manually from the open position, the RR is brought into contact with the rear end position (3) of the drain slider stopper 25, and the sunshade 6 is closed up to the half open position at the interlocking open time (viii).

As described above, in accordance with the present invention, the stopper 25 is provided in the drain slider 20, the rear end of the front sunshade slider 30 is brought into contact with the front end of the stopper 25 so as to inhibit the sunshade 6 from moving further, rearward at the time of manually moving the sunshade 6 rearward to open the sunshade 6 in the closed (tilting) state of the sliding panel 4, and the front end of the rear sunshade slider 40 is brought into contact with the rear end of the stopper 25 so as to inhibit the sunshade 6 from moving further forward, at the time of manually moving the sunshade 6 forward to close the sunshade 6 up to the interlocking open position in the fully open or half open state of the sliding panel 4.

Accordingly, as is different from the conventional structure in which the sunshade sliders 30 and 40 are directly brought into contact with the movable drain 10, it is possible to prevent the impact from being directly applied to the movable drain 10 from the sunshade sliders 30 and 40 even when the sunshade 6 is manually opened and closed roughly, and it is possible to prevent the great impact from being applied to the movable drain 10. Accordingly, it is not necessary to make the movable drain 10 thick, and it is possible to achieve a thin size and a weight saving. Further, it is not necessary to firmly mount the movable drain 10 to the drain slider 20 by the bolt fastening, the rivet fastening or the like, and it is possible to simplify the mounting of the movable drain 10.

As described above in accordance with the sunroof apparatus for the vehicle of the present invention, the sunshade can be held at the predetermined position without generating any entanglement in the engagement piece of the holding means for the sunshade. Further, it is possible to prevent the great impact from being applied to the movable drain even when manually opening and closing the sunshade roughly, and therefore it is possible to make the movable drain thin and light and to simplify the mounting.

What is claimed is:

1. A sunroof apparatus for a vehicle comprising:
 a sliding panel in which an opening is formed in a roof of the vehicle, mounting frames are placed in both sides along a longitudinal direction of the vehicle in a side of a passenger room facing to the opening, front and rear panel sliders are fitted to a panel sliding groove formed in the mounting frame, and the sliding panel is slidably placed in the longitudinal direction of the vehicle by mounting the sliding panel to the front and rear panel sliders so as to open and close the opening of said roof in accordance with the sliding motion; and
 a sunshade in which front and rear sunshade sliders are fitted to a sunshade sliding groove formed in said mounting frame, and the sunshade is placed in a lower side of said sliding panel so as to freely slide in the longitudinal direction of the vehicle by mounting the sunshade to the front and rear sunshade sliders, whereby the sunshade is manually movable in the longitudinal direction and covers the lower side of said sliding panel, wherein a notch is formed at a predetermined position of said sunshade sliding groove, and an engagement piece made of an elastic member and being capable of fitting to said notch is integrally provided in at least one of said front and rear sunshade sliders, and wherein said sunshade moves to a position at which said engagement piece and said notch are fitted and is lightly held in accordance with the fitting between said engagement piece and said notch in such a manner as not to move from the moved position.

2. A sunroof apparatus according to claim 1, wherein said notch is formed into a valley-shaped recess portion having a gentle incline, and said engagement piece is an elastic member plate which has a convex portion fitted into said recess portion and which is supported to said sunshade slider in a cantilever manner.

3. A sunroof apparatus according to claim 2, wherein said sunshade slider is made of a resin, said elastic member plate is integrally formed with the sunshade slider, and a leaf spring is press inserted between said elastic member plate and the sunshade slider main body.

4. A sunroof apparatus according to any one of claims 1 to 3, comprising:

a movable drain extending in a width direction of the vehicle, in which a drain slider is fitted to said panel sliding groove, and the movable drain is placed in a lower side of a rear end of said sliding panel in an upper side of said sunshade so as to freely slide in the longitudinal direction of the vehicle by mounting the movable drain to the drain slider, wherein a stopper protruding above said sunshade sliding groove is integrally provided in said drain slider, and a rear end of said stopper is brought into contact with a front end of said rear sunshade slider, thereby allowing said sunshade to move to a rear side interlocking with a rearward movement of said movable drain, wherein at the time of manually opening said sunshade with respect to said sliding panel in a state in which said sliding panel is fully closed, said sunshade is inhibited from moving rearward further by bringing the rear end of said front sunshade slider into contact with the front end of said stopper, and wherein at the time of manually closing said sunshade with respect to said sliding panel in an open state including a half open state, said sunshade is inhibited from moving forward further by bringing the front end of said rear sunshade slider into contact with the rear end of said stopper.

5. A sunroof apparatus for a vehicle comprising:

a sliding panel in which an opening is formed in a roof of the vehicle, mounting frames are placed in both sides along a longitudinal direction of the vehicle in a side of a passenger room facing to the opening, front and rear panel sliders are fitted to a panel sliding groove formed in the mounting frame, and the sliding panel is slidably placed in the longitudinal direction of the vehicle by mounting the sliding panel to the front and rear panel sliders so as to open and close the opening of said roof in accordance with the sliding motion;

a movable drain extending in a width direction of the vehicle, in which a drain slider is fitted to said panel sliding groove, and the movable drain is placed in a lower side of a rear end of said sliding panel so as to freely slide in the longitudinal direction of the vehicle by mounting the movable drain to the drain slider; and a sunshade in which front and rear sunshade sliders are fitted to a sunshade sliding groove formed in said mounting frame, and the sunshade is placed in a lower side of said sliding panel and in a lower side of said movable drain so as to freely slide in the longitudinal direction of the vehicle by mounting the sunshade to the front and rear sunshade sliders, whereby the sunshade is manually movable in the longitudinal direction and covers the lower side of said sliding panel, wherein a stopper protruding above said sunshade sliding groove is integrally provided in said movable drain slider, and a rear end of said stopper is brought into contact with a front end of said rear sunshade slider, thereby allowing said sunshade to move to a rear side interlocking with a rearward movement of said movable drain, wherein at the time of manually opening said sunshade with respect to said sliding panel in an open state in which said sliding panel is fully closed, said sunshade is inhibited from moving rearward further by bringing the rear end of said front sunshade slider into contact with the front end of said stopper, and wherein at the time of manually closing said sunshade with respect to said sliding panel in an open state including a half open state, said sunshade is inhibited from moving forward further by bringing the front end of said rear sunshade slider into contact with the rear end of said stopper.

6. A sunroof apparatus for a vehicle according to claim 5, wherein an impact absorbing member is provided on a surface of said stopper.

7. A sunroof apparatus for a vehicle according to claim 5 or 6, wherein fixed drains are integrally formed in a front portion and both side portions of said mounting frame.

8. A sunroof apparatus for a vehicle according to claim 5, wherein stoppers are provided in a front end portion and a rear end portion of said sunshade sliding groove, wherein said sunshade is inhibited from moving further forward by bringing the front end of said front sunshade slider into contact with the rear end of the stopper in said front end portion, at the time of fully closing said sunshade manually with respect to said sliding panel, in a fully closed state of said sliding panel, and wherein said sunshade is inhibited from moving further rearward by bringing the rear end of said rear sunshade slider into contact with the front end of the stopper in said rear end portion, at the time of opening said sunshade with respect to said sliding panel, in an open state including a half open state of said sliding panel.

9. A sunroof apparatus according to claim 5, wherein a supporting portion supporting said sliding panel and the drain slider are connected to each other by a rod, thereby allowing said sliding panel to move in a longitudinal direction interlocking with the movement of said drain slider in the longitudinal direction.

10. A sunroof apparatus as recited in claim 6, wherein said impact absorbing member is made of rubber.

* * * * *